UNITED STATES PATENT OFFICE.

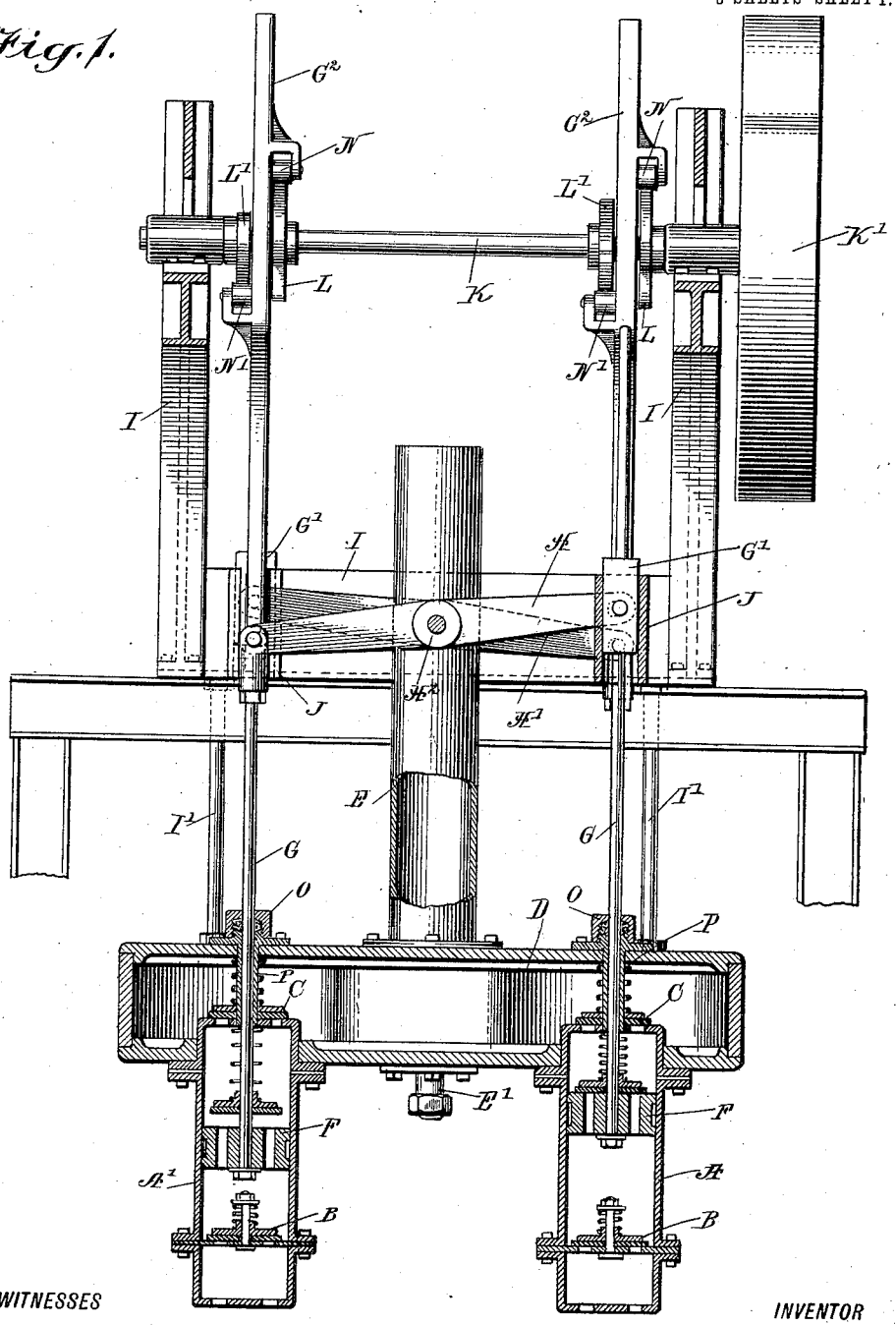

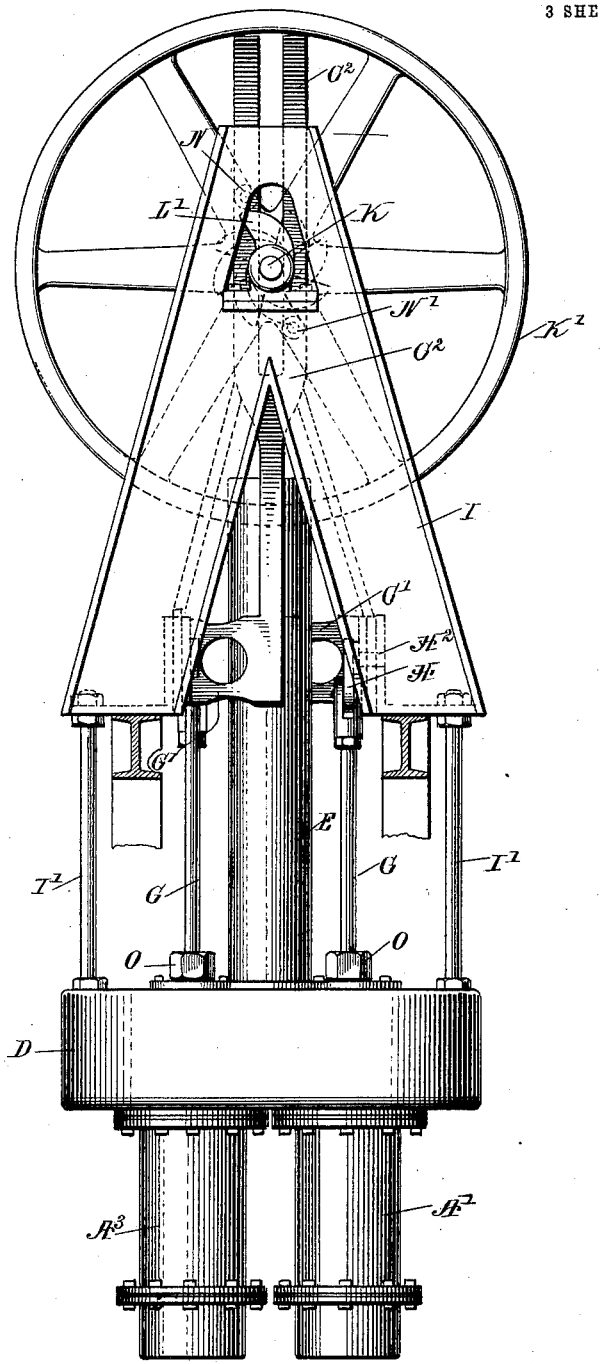

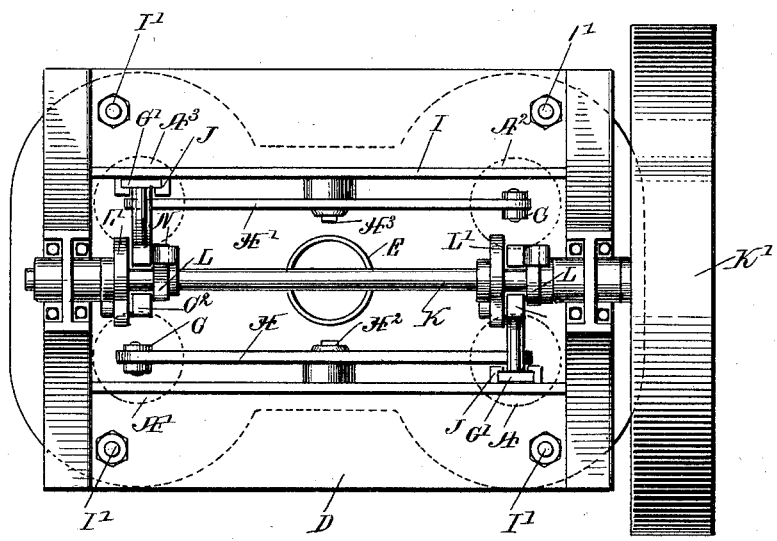

GEORGE GRIFFEN McNEE, OF CLAY CENTER, KANSAS, ASSIGNOR OF ONE-HALF TO JOHN THOMAS FITCH, OF HELPER, UTAH.

PUMP.

1,032,847.  Specification of Letters Patent.  Patented July 16, 1912.

Application filed May 4, 1911, Serial No. 624,907. Renewed May 7, 1912. Serial No. 695,783.

*To all whom it may concern:*

Be it known that I, GEORGE G. McNEE, a citizen of the United States, and a resident of Clay Center, in the county of Clay and State of Kansas, have invented a new and Improved Pump, of which the following is a full, clear, and exact description.

The object of the invention is to provide a new and improved pump, more especially designed for irrigation and similar work, and provided with one, two or more pairs of cylinders to permit of pumping a large amount of water in a comparatively short time and without requiring much motive power for actuating the pump.

For the purpose mentioned, use is made of one or more pairs of cylinders, in which reciprocate plungers, a lever connecting the plunger rods of a pair of cylinders with each other, a driven cam shaft, and cams on the said shaft engaging one of the said plunger rods to alternately raise and lower the same, whereby a similar motion in reverse order is given to the other plunger rod by the said lever.

A practical embodiment of the invention is represented in the accompanying drawings forming a part of this specification, in which similar characters of reference indicate corresponding parts in all the views.

Figure 1 is a sectional side elevation of the pump provided with two pairs of cylinders; Fig. 2 is an elevation of one end of the pump; and Fig. 3 is a plan view of the same.

As shown in the drawings, the pump is provided with two pairs of cylinders A, A' and A², A³, each provided at its lower end with a suitable suction valve B and at its upper end with a discharge valve C opening into a water chamber D, to the under side of which are secured the said cylinders A, A', A² and A³, the cylinders extending with their upper ends into the said water chamber D, as plainly indicated in Fig. 1. The water chamber D is provided on the top with a pipe E for conducting the water pumped by the pump to a suitable place of discharge, and the bottom of the water chamber D is provided with a normally closed nipple E' for periodically cleaning the water chamber D of sediment.

In each of the cylinders A, A', A² and A³ is mounted to reciprocate a valve plunger F provided with a plunger rod G extending upwardly through the water chamber D, and the plunger rods G for the pair of cylinders A, A' are connected with each other by a lever H, and a similar lever H' connects the plunger rods G of the cylinders A², A³ with each other. The levers H, H' are pivoted at their middle at H² and H³ on an overhead framework I connected by standards I' with the top of the water chamber D. The plunger rods G for the cylinders A, A³ are provided with flattened portions G' mounted to slide in guideways J attached to the framework I, and the said plungers have their upper ends G² forked to straddle a driven shaft K journaled in suitable bearings arranged on the overhead framework I. The shaft K is provided with a pulley K' connected by a belt with other machinery for imparting a continuous rotary motion to the shaft K.

On the shaft K are secured two pairs of two-armed cams L and L' engaging friction rollers N and N' journaled on the upper ends G² of the plunger rods G for the cylinders A and A³. The cams L are the lifting cams for lifting the plungers F in the cylinders A and A³, and the cams L' act on the friction rollers N' to move the plungers F for the cylinders A and A³ downward, and the two sets of cams L and L' are set at angles one relative to the other so that the cams L successively lift the plunger rods G for the cylinders A and A³, and consequently in a like manner the said plunger rods are successively lowered by the action of the cams L' on the friction rollers N'. Now by having the plunger rods G of the cylinders A and A³ connected by the levers H and H' with the plunger rods for the cylinders A' and A², it is evident that a corresponding down and up movement is given to the plungers F in the cylinders A' and A², whereby a continuous stream of water is pumped and discharged by way of the pipe E.

By having the two-armed cams L and L' arranged in the manner described, it is evident that two lifting strokes are obtained in each cylinder for every revolution of the cam shaft K, that is, eight lifting strokes in the four cylinders at each revolution of the shaft K, and consequently a large amount of water can be pumped in a comparatively short time and without requiring much motive power for actuating the pump.

The plunger rods G pass through suitable stuffing boxes O arranged on the top or cover of the water chamber D, and pipes P extend from the stuffing boxes O to the tops of the cylinders A, A', A² and A³ so as to permit convenient repairing of the stuffing boxes O without danger of leakage of water from the chamber D at the time the stuffing box O is opened.

The overhead framework I, in practice, rests on a foundation, and the rods I' hold the water chamber D suspended in the well or other water supply.

Having thus described my invention, I claim as new and desire to secure by Letters Patent:

A pump comprising a valved cylinder, a valved plunger reciprocating within said cylinder, means to actuate said plunger, a water chamber into one side of which said cylinder extends and discharges, a stuffing box at the opposite side of the said water chamber around the plunger rod, and a pipe forming a part of the stuffing box, said pipe surrounding the plunger rod and extending through the water chamber and into the head of the cylinder, whereby to prevent water in the water chamber from passing into the stuffing box when the latter is open.

In testimony whereof I have signed my name to this specification in the presence of two subscribing witnesses.

GEORGE GRIFFEN McNEE.

Witnesses:
E. L. LINDNER,
WALLACE H. VINCENT.

---

Copies of this patent may be obtained for five cents each, by addressing the " Commissioner of Patents Washington, D. C."